(12) United States Patent
Reed et al.

(10) Patent No.: US 7,533,414 B1
(45) Date of Patent: May 12, 2009

(54) DETECTING SYSTEM ABUSE

(75) Inventors: Erik J. Reed, Dublin, CA (US); Udi Manber, Palo Alto, CA (US)

(73) Assignee: Yahoo! Inc., Sunnyvale, CA (US)

( * ) Notice: Subject to any disclaimer, the term of this patent is extended or adjusted under 35 U.S.C. 154(b) by 467 days.

(21) Appl. No.: 10/803,473

(22) Filed: Mar. 17, 2004

(51) Int. Cl.
*G06F 11/00* (2006.01)

(52) U.S. Cl. .......................... 726/22; 726/25; 709/225

(58) Field of Classification Search ................ 726/22, 726/25; 709/225
See application file for complete search history.

(56) References Cited

U.S. PATENT DOCUMENTS

| | | | | |
|---|---|---|---|---|
| 5,586,301 A | * | 12/1996 | Fisherman et al. | 711/152 |
| 6,832,086 B1 | * | 12/2004 | Powers et al. | 455/423 |
| 7,002,973 B2 | * | 2/2006 | MeLampy et al. | 370/401 |
| 2002/0083178 A1 | * | 6/2002 | Brothers | 709/226 |
| 2003/0061332 A1 | * | 3/2003 | Narad et al. | 709/223 |
| 2003/0229717 A1 | * | 12/2003 | Teague | 709/246 |

* cited by examiner

*Primary Examiner*—Kimyen Vu
*Assistant Examiner*—Suman Debnath
(74) *Attorney, Agent, or Firm*—Morrison & Foerster LLP

(57) ABSTRACT

A system continually monitors service requests and detects service abuses. First, a screening list is created to identify potential abuse events. A screening list includes event IDs and associated count values. A pointer cyclically selects entries in the table, advancing as events are received. An incoming event ID is compared with the event IDs in the table. If the incoming event ID matches an event ID in the screening list, the associated count is incremented. Otherwise, the count of a selected table entry is decremented. If the count value of the selected entry falls to zero, it is replaced with the incoming event. Event IDs can be based on properties of service users, such as user identifications, or of service request contents, such as a search term or message content. The screening list is analyzed to determine whether actual abuse is occurring.

21 Claims, 4 Drawing Sheets

| EVENT ID | COUNT | BLOCK |
|---|---|---|
| 72 | 10000 | YES |
| 85 | 9800 | NO |
| 117 | 25000 | YES |
| 228 | 419 | YES |
| 7 | 1330 | NO |
| 14 | 1 | YES |

FIG. 3

DETECTING SYSTEM ABUSE

BACKGROUND OF THE INVENTION

This invention relates to the field of monitoring computer usage generally, and specifically to software applications for detecting system abuse. Many web site operators provide services to a group of users. Some web sites, referred to as portals, integrate multiple services together to present its users with a comprehensive online experience. Examples of the services provided by web sites and portals include search engines, instant messaging, e-mail, message boards, news, financial data, sports, and online shopping and auctions.

Many web site operators and especially portal operators provide these services for free or at low cost, often solely for their users' personal use. However, unscrupulous users and organizations seek to misuse or overuse these for financial gain or nefarious purposes. Service misuse, overuse, and other wrongful exploitation of a web site's services is referred to generally as "abuse."

Examples of abuse include crawling a web site to steal and repackage its content, sending spam or unsolicited advertising messages via e-mail, message boards, or instant messaging, and requesting a large number of search requests to find recently expired Internet domain names that can be purchased and ransomed. Abuses cost the web site operator money, for example in the form of extra computing resources needed to handle abuse traffic, lost revenue from legitimate users driven away by the abuse, and increased fees paid by the web site operator to service providers, such as search engines, for the services consumed by abusers.

Preventing abuse is a difficult challenge. First, there is the problem of detecting abuse. A web site service may have thousands or millions of simultaneous users. Because of the large number of users, it is difficult for current monitoring systems to detect abuse as it occurs. Instead, most monitoring systems review service log files sporadically, for example daily, to determine if abuse has previously occurred. If a service log reveals an abusive user, that user can be blocked from the service. However, by the time the abuse is detected, the abuser has already changed identities, such as IP addresses or user IDs, making it difficult to prevent future abuse. Furthermore, processing service logs is a time-consuming task.

Additionally, abusers can take steps to mask their abusive behavior. For example, if a service is provided by multiple servers, the abuser can distribute their service requests among different servers, thereby diluting the number of service requests in each service log. Unless the web site operator cross-references all of its service logs, which greatly increases the time and resources spent processing service logs, this abuse will go undetected.

Moreover, monitoring software must be careful to only block service abusers and not legitimate users. Because of the large number of users that must be analyzed in service logs, it is often too expensive in terms of time and resources to apply complex analyses of user activity, referred to as filters, to identify abusers. Instead, monitoring software must rely on simplistic filters that are either over-inclusive, thereby blocking legitimate users, or under-inclusive, thereby allowing service abusers.

It is therefore desirable for monitoring system to detect service abuse as it occurs, rather than in subsequent analysis. It is further desirable that the monitoring system detect service abuse spread over multiple services. It is still further desirable that the monitoring system allow for complex filters to effectively screen out abusers while allowing for legitimate users.

BRIEF SUMMARY OF THE INVENTION

An embodiment of the invention monitors, preferably continuously, service requests and detects service abuses. First, a screening list is created to identify potential abuse events. Second, the screening list is analyzed to determine whether actual abuse is occurring. A screening list includes event IDs and associated count values. A pointer cyclically selects entries in the table, advancing as events are received. An incoming event ID is compared with the event IDs in the table. If the incoming event ID matches an event ID in the screening list, the associated count is incremented. Otherwise, the count of a selected table entry is decremented. If the count value of the selected entry falls to zero, it is replaced with the incoming event and the count is reset to one. Event IDs can be based on properties of service users, such as user identifications, or of service request contents, such as a search term or message content.

In an embodiment, a system for identifying service abuse includes a plurality of server computers. Each server computer is adapted to receive an event and to create an event packet in response to the event. A cluster host is adapted to receive a plurality of event packets from at least a portion of the server computers and to update a master screening table in response to the plurality of event packets. The cluster host communicates a local screening table to each of the server computers. The local screening table comprises at least a portion of the master screening table. In specific embodiments, the local screening table is a copy of the master screening table. The server computers are preferably adapted to disregard events matching a portion of the local screening table.

Each event packet may include an event identification associated with a event. The event identification may correspond with the identity of a user. Examples of event identifications include an IP address and a user identification. The event identification may correspond with a content value included in the event. Examples of content value include at least a portion of a message, a portion of a URL, or a hash of the content value included in the event.

In yet another embodiment, the cluster host is further adapted to determine a metric value for an entry of the master screening table. The metric indicates whether the event is an abusive request. The cluster host may then set a block value associated with the entry in response to the metric value. In an alternate embodiment, the cluster host is adapted to determine an average metric value from the metric value and a set of previous metric values. The cluster host may then set a block value associated with the entry in response to the average metric value.

The cluster host may be adapted to determine a first sub-metric value from an entry of a first master screening table and a second sub-metric value from an entry of a second master screening table. The cluster host determines the metric value from a weighted combination of the first and second sub-metric values.

BRIEF DESCRIPTION OF THE DRAWINGS

The present invention will be discussed with reference to the drawings, in which:

FIG. 3 illustrates an example application of a method for continuously filtering events to detect potential system abusers according to an embodiment of the invention.

DETAILED DESCRIPTION OF THE INVENTION

Figure 1:
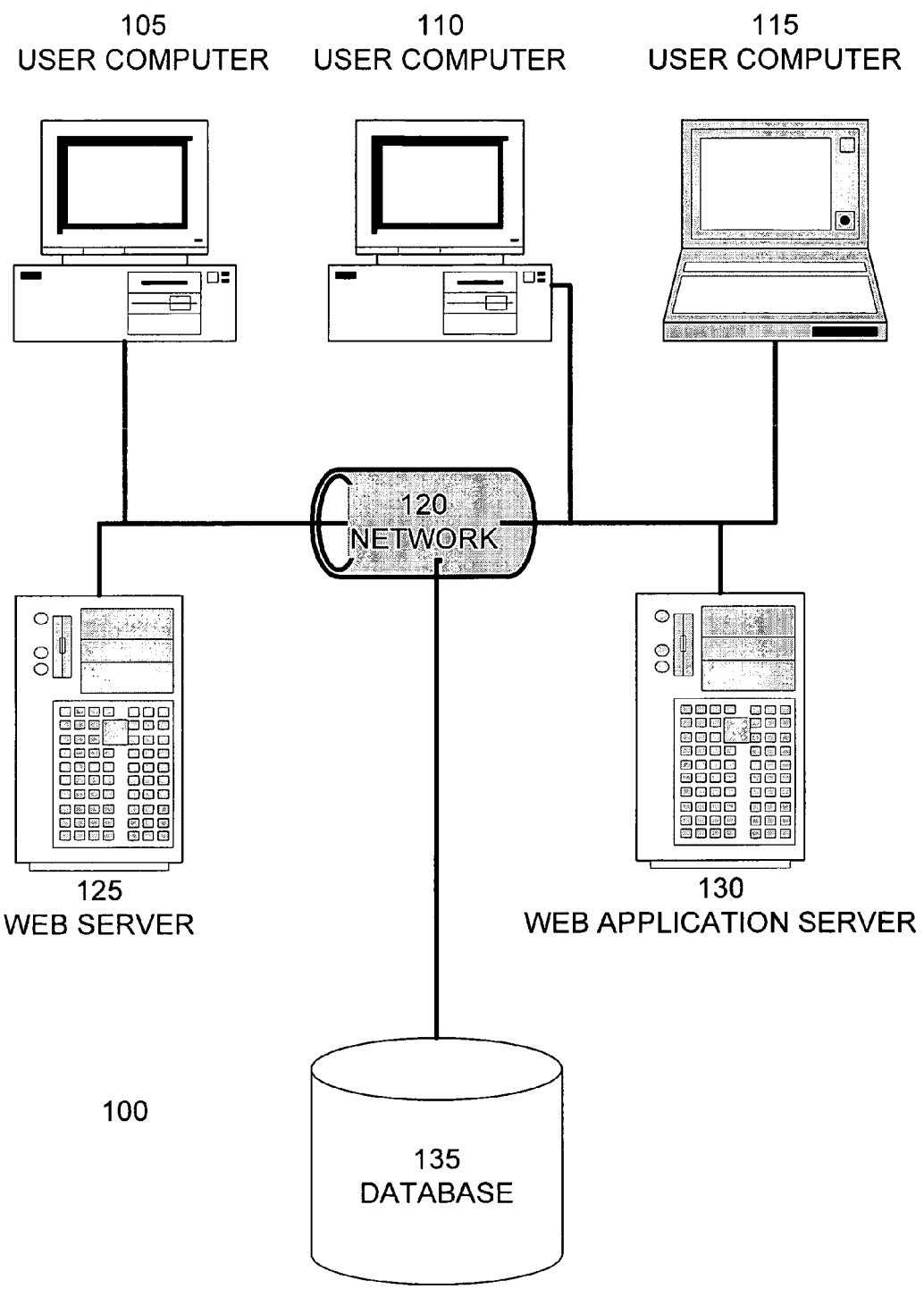
FIG. 1 is a block diagram of a system for implementing an embodiment of the invention.

FIG. 1 is a block diagram of a system 100 for implementing an embodiment of the invention. System 100 includes user computers 105, 110, and 120. User computers 105, 110, and 120 can be general purpose personal computers having web browser applications. Alternatively, user computers 105, 110, and 120 can be any other electronic device, such as a thin-client computer, Internet-enabled mobile telephone, or personal digital assistant, capable of displaying and navigating web pages or other types of electronic documents. Although system 100 is shown with three user computers, any number of user computers can be supported.

A web server 125 is used to process requests for web pages or other electronic documents from user computers 105, 110, and 120. In an embodiment of the invention, all user interaction with the system is via HTTP traffic between user computers and the web server 125. System 100 may include multiple instances of web server 125 to effectively serve a larger number of user computers. All of the web servers can be located using the same web address, with each user computer request dynamically or statically allocated to one of the instances of web server 125.

Web application server 130 operates one or more applications used for processing requests. In an embodiment, the web application server 130 is one or more general purpose computers capable of executing programs or scripts in response to the user computers 105, 110 and 115. The web application can be implemented as one or more scripts or programs written in any programming language, such as Java™, C, or C++, or any scripting language, such as Perl, Python, or TCL.

In an embodiment, the web application server 130 dynamically creates web pages for displaying the data. The web pages created by the web application server 130 are forwarded to the user computers via web server 125. Similarly, web server 125 receives web page requests and input data from the user computers 105, 110 and 120, and forwards the web page requests and input data to web application server 130.

As the web application on web application server 130 processes data and user computer requests, data can be stored or retrieved from database 135. In an embodiment, the web application on the web application server 130 can retrieve any previously stored data from the database 135 at any time. This allows users to modify or update data.

An electronic communication network 120 enables communication between computers 105, 110, and 115, web server 125, web application server 130, and database 135. Network 120 may further include any form of electrical or optical communication devices, including wireless and wired networks. Network 130 may also incorporate one or more local-area networks, such as an Ethernet network; wide-area networks, such as the Internet; and virtual networks, such as a virtual private network.

The system 100 is one example for executing an system according to an embodiment of the invention. In another embodiment, web application server 130, web server 125, and optionally database 135 can be combined into a single server computer system. In alternate embodiment, all or a portion of the web application functions may be integrated into an application running on each of the user computers. For example, a Java™ or JavaScript™ application on the user computer is used to process or store data or display portions of the application.

According to an embodiment of the invention, detecting service abuse is a two phase process. In the first phase, incoming service requests, referred to as events, are screened to determine a subset of events that may potentially be abuse. In the second phase, the potential abuse events are further analyzed to identify actual abuse events. Following the identification of actual abuse events, appropriate action can be taken to stop the abuser, such as blocking the user from the service, removing messages or e-mails sent by the abuser, or reporting the user to authorities or their Internet Service Provider (ISP).

Figure 2:
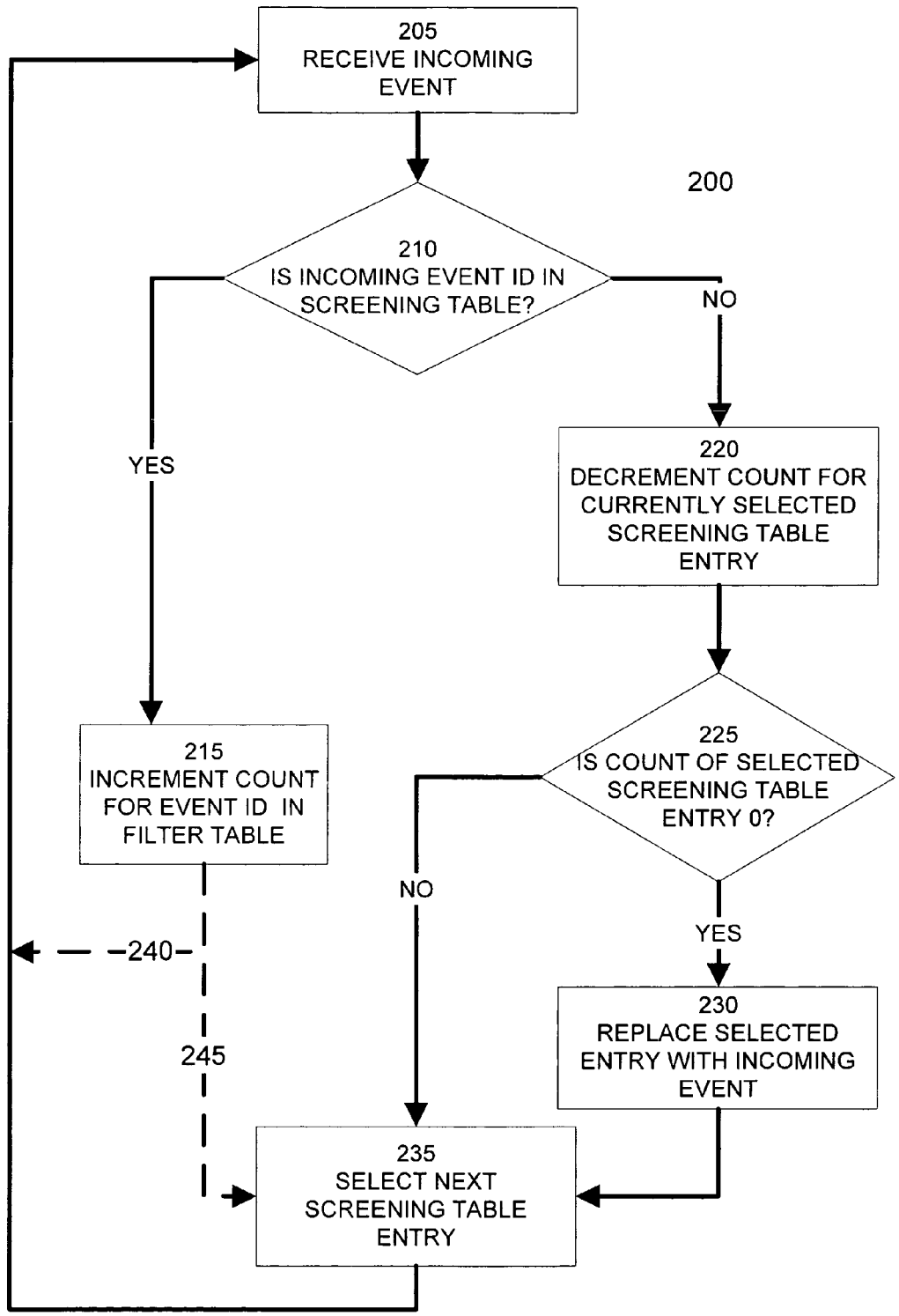
FIG. 2 is a flowchart illustrating a method for continuously screening events to detect potential system abusers according to an embodiment of the invention.

Turning to the first phase, FIG. 2 illustrates a method 200 for continuously screening events to detect potential system abusers according to an embodiment of the invention. In this embodiment, method 200 continuously updates the contents of a screening table that provides the system with a list of potentially abusive service requests. In an embodiment, screening table is a fixed-size table having N entries, roughly corresponding to the top N users of a service. In one implementation, N equals 32000, thereby enabling the monitoring of the top 32000 users of a service. However, method 200 is applicable to screening tables of any size, depending on the requirements of the web site providing the service to be monitored.

At step 205, the method receives an incoming event from a user. An event is any service request from any user. In an embodiment, all the received events for a given implementation of method 200 are requests for the same service, such as an authentication service used to log users into a system, an e-mail service, an instant messaging service, a financial data service, a search engine service, a shopping service, an auction service, a message board service, or any other service offered by a web site.

Each received event includes an event ID. In an embodiment, an event ID identifies the user requesting the service. Examples of the event ID include an e-mail address, a user identification, an IP address, a message board identification, and a instant messenger identification. In an another embodiment, an event ID is based upon the content of the request. Examples of this type of event ID include all or a portion of an e-mail, message board, or instant messenger message, a URL included in an e-mail, message board, or instant messenger message, and a search term submitted to a search engine. Another type of event ID is derived from the document, such as a web page, or service, such as search or composing e-mail, requested by the received event. In an embodiment the name of the requested document, for example "/index.html" or "/news/2004/02/1234.html," or the name of the service, for example "/search" or "/compose_msg," is the event ID.

At step 210, the event ID of the incoming event is compared with the entries of a screening table to determine if previous events with the same event ID have been received. FIG. 3, which illustrates an example application of a method for continuously filtering events to detect potential system abusers, includes an example screening table 300. In screening table 300, column 305 stores an event ID for each entry in the table. The event ID of the incoming event is compared with the event IDs in the screening table to determine whether the screening table 300 has an entry matching the event ID of the incoming event.

In one embodiment, the performance of step 210 is optimized using a hash bucket search mechanism to search the screening table for a matching event ID. In this embodiment, each event ID in the table is associated with a hash value. Entries with the same hash value are grouped together into hash buckets, which can be implemented in the form of linked lists. The event ID of the incoming event is hashed to create an incoming hash value. The incoming hash value is then used to select an appropriate hash bucket having entries matching the incoming hash value. Step 210 compares the incoming event ID with the event IDs associated with the selected hash bucket, for example by traversing the linked list, to determine whether the screening table already includes an event ID matching the event ID of the incoming event.

Following step 210, if the screening table has an event ID matching the event ID of the incoming event, step 215 increments a count value in the screening table associated with the event ID. For example, screening table 300 includes a column 310 for storing a count value associated with each event ID. If the incoming event ID is 85, matching one of the event ID already listed in example screening table 300, then the count value associated with this event ID, 9800, would be incremented, for example to 9801.

Following step 215, in one embodiment of method 200, execution returns to step 205 via path 240 to await the arrival of another incoming event. In an alternate embodiment, step 235 is performed. Step 235, discussed in more detail below, advances a pointer selecting one entry in the screening table to the next screening table entry.

Returning to step 210, if the incoming event ID does not match any event IDs in the screening table, execution proceeds to step 220. In addition to the screening table, method 200 maintains a pointer to one entry in the screening table, referred to as the selected entry. At step 220, the count value of this selected entry is decremented. For example, in screening table 300, pointer 320 has selected screening table entry 325, which has a count of 25000. In this example, if the event ID of the incoming event does not match any event IDs in the screening table 300, then the count value of entry 325 is decremented, for example to 24999.

Step 225 determines if the count value for the selected entry is zero. If the count value of the selected entry is not zero, then execution proceeds to step 235. If the count value of the selected entry is zero, then at step 230, the selected entry in the screening table is replaced by the incoming event and the associated count value is reset to one. For example, in screening table 300, if pointer 320 has selected entry 330, rather than entry 325, then step 220 would decrement the count value of entry 330 from one to zero. Following step 225, the execution of step 230 would replace entry 330 with the incoming event ID and set the count value to one. In a further embodiment, other parameters associated with each entry of the screening table, such as a link to a hash bucket as discussed above or a block value discussed below, are initialized in step 330 for the incoming event ID.

Step 235 advances the pointer to the next entry of the screening table, thereby selecting a different entry in the screening table. If the pointer is at the last entry of the screening table, an embodiment of step 235 resets the pointer to the first entry of the screening table. As discussed above, an embodiment of method 200 advances the pointer for each incoming event, even when the event ID of the incoming event matches an event ID in the screening table, as shown by path 245. An alternate embodiment only advances the pointer when the event ID of the incoming event does not match an event ID in the screening table, as shown by path 240.

Following step 235, execution proceeds back to step 205 to await the next incoming event. The result of method 200 is a screening table continually updated with roughly the top N users of a service. Step 235, by advancing the pointer cyclically through the screening table, ensures that the count values of each table entry are "aged" in proportion to the event rate, rather than an absolute measure of time. This allows event IDs that become inactive to eventually drop off the screening table, while continually active event IDs stay on the screening table. Further, because the pointer moves in proportion of the rate that events are received, the screening table takes into account varying levels of service utilization. This makes method 200 suitable for services with a wide range of utilization levels, for example from as low as a few events an hour to as high as thousands of events per second. Additionally, services with a high degree of temporal variability in utilization levels, such as those used often during the day but infrequently at night, will also be properly screened by method 200.

Figure 4:
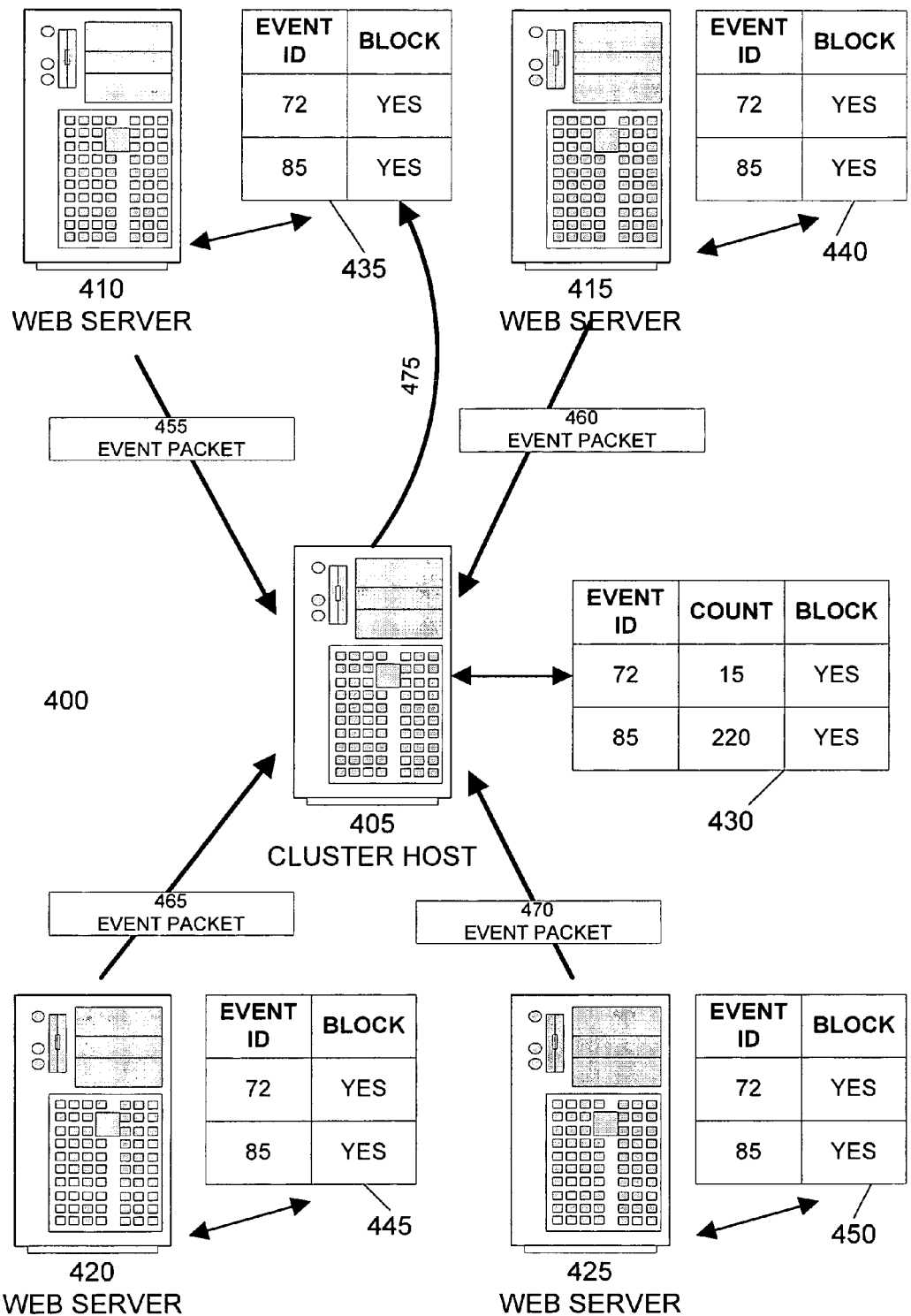
FIG. 4 illustrates a clustering implementation of a method for continuously filtering events to detect potential system abusers according to an embodiment of the invention.

As discussed above, service abusers can distribute their service requests over several server computers associated with a service, thereby diluting the impact on each server and escaping detection by prior monitoring systems. A further embodiment of the invention can be implemented over a group or cluster of connected computers to detect service abuse spread over multiple servers. FIG. 4 illustrates a clustering implementation 400 of a method for continuously filtering events to detect potential system abusers according to an embodiment of the invention.

In clustering implementation 400, a screening table is shared between multiple server computers. Clustering implementation 400 includes a cluster host 405 and server computers 410, 415, 420, and 425. The cluster host 405 is responsible for continually updating a master copy 430 of screening table. Server computers 410, 415, 420, and 425 receive service requests, or events, from users.

For each incoming event, the server computer generates an event packet including an event ID, such as event packet 455, and forwards the event packet to the cluster host 405. In a further embodiment, server computers 410, 415, 420, and 425 also compare the event ID for each incoming event with their local copy of the screening table, 435, 440, 445, and 450, respectively. The screening tables 435, 440, 445, and 450 each include a block value associated with each event ID indicating whether service requests having that event ID should be blocked. If the screening table does not have an event ID for an incoming event or does not indicate that an event ID is to be blocked, the server computer proceeds with fulfilling the service request. Otherwise, the service request is not fulfilled. The server computer can not fulfill the service request in a number of ways. For example, the server may terminate the HTTP or other networking protocol connection with the requesting system or may return an error document or message. In an alternate embodiment, incoming events matching an entry of the screening table indicating that an event is to be blocked are marked for further scrutiny and then fulfilled.

Each server computer may include one or more server applications running independently. The local screening table is stored in shared memory accessible to all server applications on a server computer. Each server application receives service requests from users, generates an event packet to be forwarded to the cluster host, accesses the screening table, and determines from the screening table whether service requests should be fulfilled.

The cluster host 405 receives event packets, such as packets 455, 460, 465, and 470, from all of the server computers in the cluster implementation. The cluster host 405 processes each event packet in a similar manner to an incoming event as described in method 200. As a result, cluster host 405 continually updates the master copy of the screening table 430 to reflect events received by all of the server computers in the cluster implementation. In an embodiment, the cluster host 405 and server computers 410, 415, 420, and 425 operate asynchronously to each other, so that the server computers can continue to process incoming events while sending and receiving packets from the cluster host.

In addition to updating the event IDs and associated count values of screening table 430, cluster host can compute and update other parameters included in the screening table, such as the block value that determines whether a service request should be blocked. The block value can be determined in a number of ways, depending on analysis applied to the screening table. Example screening table analyses are discussed in detail below.

In another embodiment, the cluster host sends updates for individual entries in the screening table to each of the servers in the cluster implementation. In this embodiment, as the cluster host updates a screening table entry from a non-blocked to a blocked value, the cluster host updates the server computers in the cluster implementation so that abusive events are blocked immediately by the server computers.

Periodically, the cluster host 405 sends an updated screening table to each server computer in the cluster implementation. For example, cluster host 405 sends an updated screening table 475 to server computer 410. The updated screening table replaces the local copy of the server computer. In an embodiment, the updated screening table 475, and thus the local copy of the screening table on each server computer, is a copy of the master copy of the screening table 430. In a further embodiment, a block value can be determined from the screening table either by the cluster host or by the server computer having a local copy of the screening table. In an alternate embodiment, the updated screening table 475 omits parameters unneeded by the server computer, such a count value. In this embodiment, the updated screening table only includes information needed to determine whether a service request is to be blocked, such as event IDs and a block value.

The screening table quickly and efficiently creates a continuously updated list of potential service abuses. Because the number of entries in the screening table is typically much smaller than the total number of events being processed by the server computers, the system can subject the entries in the screening table to further scrutiny and complex analyses to determine whether the events represent actual service abuse without needing a large amount of computing resources.

As the use of a screening table to identify potential service abuses is applicable to any type of service provided by a web site, the analysis used to identify actual service abuse will vary. In one implementation, event IDs having the highest counts on a screening table are automatically blocked.

In a refinement of this implementation, specific event IDs on a "white list" are permitted regardless of the count values. This is useful, for example, in cases where an Internet Service Provider sends all of its users' requests from a single IP address. In this case, an Internet Service Provider may send out requests from thousands or millions of its users from a single IP address. If the event ID is derived from the IP address, then these requests from many different users will appear to the system as a large number of requests from a single user. As a result, the system may block all of the requests from an Internet Service Provider. To prevent erroneous blocking of requests from multiple users sharing an IP address, the IP addresses or event IDs corresponding to large, well-known Internet Service Providers may be included in a white list, thereby allowing a larger or unlimited number of requests from these event IDs.

In another embodiment, multiple screening tables are combined to determined whether events should be blocked. In an example of preventing instant messenger spam, a first screening table uses message content, or a hash value determined from message content, as an event ID. The first screening table tracks the most common content in instant messenger events. Instant messenger spam will often send the same message to thousands or millions of users in a short time frame. By using a screening table based upon message content, the system can detect when a large number of messages are being sent with the same content. In a further embodiment, a white list may be used to disregard common phrases used in typical instant messages, such as "hi" or "LOL." Because these common phrases are widely used in legitimate messages, they are not indicative of service abuse and should not be blocked.

A second screening table uses instant messenger IDs as event IDs to track the top instant message users. In an embodiment, a metric is computed for each event from a weighted combination of the count value of a message content on the first table with the count value of an instant messenger user ID. If the metric for the event exceeds a threshold value, the message is blocked.

In a further embodiment, an average metric value is stored for each instant messenger ID in the second table. This average metric is updated with each incoming event associated with an instant messenger ID. In this embodiment, the average metric value is compared with the threshold value to determine if the event should be blocked. In this embodiment, a single message with a suspicious metric value will not trigger blocking, but users issuing a series of events with suspicious metrics will be blocked as their average metric value crosses the threshold value.

In another embodiment, one or more screening tables are used to analyze event IDs to determine whether a series of requests originates with a single computer or multiple computers communicating from a single IP address. In the case of the latter, the threshold values used for additional screening tables tailored to others services, for example web page requests, search engine requests, e-mail access, or instant messenger use, are increased or ignored. By modifying threshold values when evaluating requests from multiple computers communicating from a single IP address, legitimate requests are not inadvertently blocked.

Other factors that may be included in determining a metric value include the time of day the event occurs, the length of a message, the similarity of the current request to previous requests matching the table entry, the time between requests matching the same table entry, and whether requests are successful or not (for example, whether a login request supplies the correct password).

Those skilled in the art will appreciate that the present invention establishes a system and method for continually monitoring service request to detect service abuses. The present invention has been described in relation to particular embodiments that are intended in all respects to be illustrative rather than restrictive. Therefore, it should be understood that the method and apparatus of the present invention could be practiced with modification and alteration within the spirit and scope of the claims herein. Furthermore, the invention may be implemented in any combination of hardware and/or software. Alternative embodiments will become apparent to those skilled in the art to which the present invention pertains without

What is claimed is:

1. A system for identifying service abuse, comprising:
a plurality of server computers each adapted to receive an event and to create an event packet in response to the event;
a cluster host adapted to receive a plurality of event packets from at least a portion of the plurality of server computers and to update a master screening table in response to the plurality of event packets,
wherein the cluster host is further adapted to communicate a local screening table comprising at least a portion of the master screening table to each of the plurality of server computers, and each of the plurality of server computers is adapted to:
receive the local screening table from the cluster host;
receive an event requesting a service;
create an event identification associated with the event;
select a table entry from a plurality of table entries in the local screening table as a selected table entry, wherein the selected table entry advances cyclically through the local screening table, and the selected table entry advances to a next entry of the local screening table in response to the event identification not being present in the local screening table;
increment a first count value associated with a first table entry of the plurality of table entries in the local screening table in response to the event identification matching an event identification associated with the first table entry;
decrement a second count value associated with the selected table entry of the plurality of table entries in response to the event identification not being present in the local screening table;
replace the selected table entry with the event identification associated with the received event in response to the second count value equaling a predetermined value; and
determine a metric value for the event from the local screening table, the metric value indicating that the event is an abusive request.

2. The system of claim 1, wherein the local screening table is a copy of the master screening table.

3. The system of claim 1, wherein each event packet includes an event identification associated with an event.

4. The system of claim 3, wherein the event identification corresponds with the identity of a user.

5. The system of claim 4, wherein the event identification includes an IP address.

6. The system of claim 4, wherein the event identification includes a user identification.

7. The system of claim 3, wherein the event identification corresponds with a content value included in the event.

8. The system of claim 7 wherein the content value includes at least a portion of a message.

9. The system of claim 7, wherein the content value includes at least a portion of a URL.

10. The system of claim 7, wherein the content value is a hash of the content value included in the event.

11. The system of claim 1, wherein the cluster host is further adapted to determine a metric value for an entry of the master screening table, the metric indicating that the entry of the master screening table corresponds to an abusive request.

12. The system of claim 11, wherein the cluster host is further adapted to set a block value associated with the entry in response to the metric value.

13. The system of claim 11, wherein the cluster host is adapted to determine an average metric value from the metric value and a set of previous metric values and to set a block value associated with the entry in response to the average metric value.

14. The system of claim 1, wherein the cluster host is adapted to determine a first sub-metric value from the entry, to determine a second sub-metric value from an entry of a second master screening table, and to determine the metric value from a weighted combination of the first and second sub-metric values.

15. The system of claim 1, wherein the predetermined value is zero.

16. The system of claim 1, wherein each of the plurality of server computers is further adapted to select a second table entry as a new selected table entry in response to receiving the event.

17. The system of claim 1, wherein each of the plurality of server computers is further adapted to select a second table entry as a new selected table entry in response to the event identification failing to match an event identification associated with the selected-table entry.

18. The system of claim 1, wherein each of the plurality of server computers is further adapted to disregard the event in response to the metric value crossing a threshold value.

19. The system of claim 1, wherein each of the plurality of server computers is further adapted to terminate a connection used to receive the event in response to the metric value crossing a threshold value.

20. The system of claim 1, wherein each of the plurality of server computers is further adapted to return an error message in response to the event in response to the metric value crossing a threshold value.

21. The system of claim 1, wherein the selected entry advances to a next entry of the local screening table in response to the event identification matching the event identification associated with the first table entry.

* * * * *